W. J. KISTLER.
SYSTEM OF ELECTRICAL WIRING.
APPLICATION FILED OCT. 3, 1913.
1,132,355.
Patented Mar. 16, 1915.
2 SHEETS—SHEET 1.
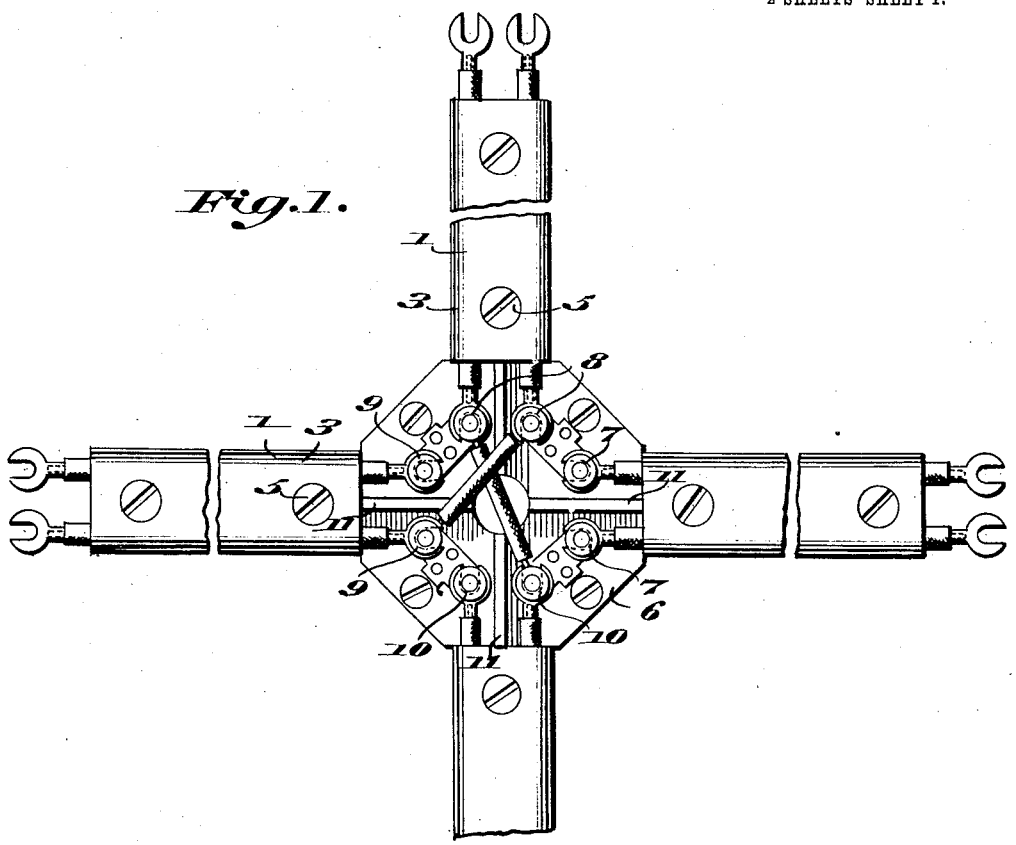
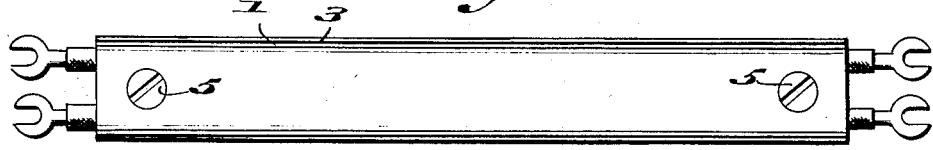
Inventor
William J. Kistler
Witnesses
By Victor J. Evans
Attorney

W. J. KISTLER.
SYSTEM OF ELECTRICAL WIRING.
APPLICATION FILED OCT. 3, 1913.

1,132,355.

Patented Mar. 16, 1915.
2 SHEETS—SHEET 2.

Witnesses
M. H. Slifer
John J. McCarty

Inventor
William J. Kistler
By Victor J. Evans
Attorney

UNITED STATES PATENT OFFICE.

WILLIAM J. KISTLER, OF COOPERSBURG, PENNSYLVANIA.

SYSTEM OF ELECTRICAL WIRING.

1,132,355.  Specification of Letters Patent.  Patented Mar. 16, 1915.

Application filed October 3, 1913. Serial No. 793,220.

*To all whom it may concern:*

Be it known that I, WILLIAM J. KISTLER, a citizen of the United States of America, residing at Coopersburg, in the county of Lehigh and State of Pennsylvania, have invented new and useful Improvements in Systems of Electrical Wiring, of which the following is a specification.

This invention relates to improvements in electric wiring systems and has particular application to electric wire molding, junction boxes and other similar connections.

In carrying out the present invention, it is my purpose to provide an electric wire molding whereby the electric current carrying conductors will be effectively insulated from adjacent objects and from one another and whereby coöperating conductors will be held spaced apart in parallelism to prevent short circuiting and like accidents.

It is also my purpose to provide a junction box whereby a plurality of pairs of conductors may be connected in parallel with one another so that any number of branch circuits may be conveniently taken off of the main feed wires.

Furthermore, I aim to provide a system of the class described wherein one section of molding may be readily and conveniently connected to another section.

With the above and other objects in view, the invention consists in the construction, combination and arrangement of parts hereinafter set forth in and falling within the scope of the claim.

Figure 2:
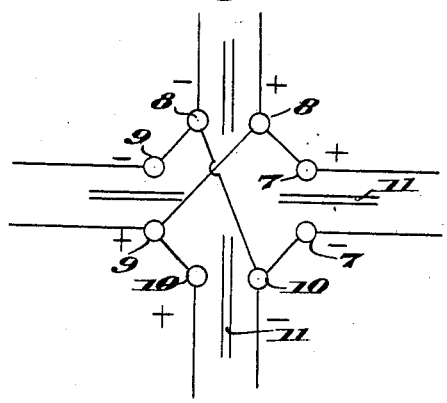
Figure 5:
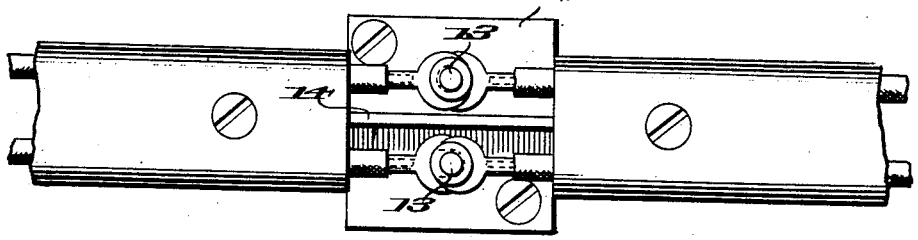
Figure 6:
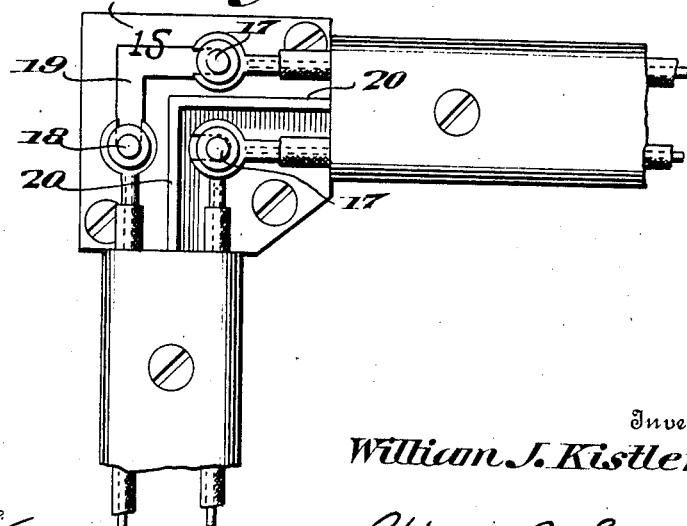

In the accompanying drawings: Figure 1 is a top plan view of a junction box and a plurality of pairs of conductors radiating therefrom, the cover of the junction box being removed and the conductors incased in molding constructed in accordance with the present invention. Fig. 2 is a diagrammatic view of the junction box. Fig. 3 is a top plan view of a section of molding. Fig. 4 is a transverse sectional view therethrough. Fig. 5 is a fragmentary top plan view of two sections of molding showing a straight of way connection between the same. Fig. 6 is a fragmentary top plan view of two sections of molding showing the angle connections between the same.

Referring now to the accompanying drawings in detail, the numerals 1 designate the sections of molding and each section is of any desired length and comprises a pair of tubes 2 constructed of fiber or other suitable insulating material and designed to envelop the electric current carrying conductors or wires.

Incasing the pair of tubes 2 is a metallic jacket 3 preferably, although not necessarily, composed of seamless brass tubing. This jacket is elongated in cross section and, in the present instance, has the lower wall thereof grooved longitudinally as at 4 between the tubes 2 to maintain the latter spaced apart in parallelism. The top and bottom walls of the jacket between the tubes 2 are formed with alining openings designed to receive screws 5 or other fastening devices whereby the molding may be securely fastened to the support. By means of this construction, it will be seen that each section of molding effectively insulates the electric current carrying conductors from surrounding objects and from each other, while such conductors are held spaced apart thereby preventing short circuiting and other like accidents.

In order that a plurality of pairs of conductors or wires may be connected in multiple with each other so as to form in effect a plurality of circuits all fed from a single source of current, I employ a junction box comprising, in the present instance, a base plate 6 constructed of fiber or other suitable insulating material.

Upstanding from the base plate 6 and suitably secured thereto are pairs of binding posts 7, 8, 9 and 10. The binding posts of all pairs connected with negative conductors are electrically connected one to the other, while the binding posts secured to positive conductors are connected one to another electrically. For instance, the binding post of the pair 7 connected with the positive conductor is connected with the adjacent binding post of the pair 8, while the last-mentioned binding post is connected with one post of the pair 9, the positive binding post of the pair 9 being electrically connected with the adjacent post of the pair 10. Likewise, the negative binding post of the pair 7 is connected with the adjacent binding post of the pair 10, while the last-mentioned binding post is bridged across to the free binding post of the pair 8 and the latter connected with the adjacent post 9. By means of this construction, it will be seen that the pairs of circuit wires connected with the respective pairs of binding posts are connected in multiple with each other so that all of such circuit wires may be fed from a single source of current. Arranged between the binding post at each pair is a partition or division plate 11 by means of which short circuiting of the adjacent binding posts is eliminated. Any suitable form of cover may be employed for inclosing the binding posts.

In Fig. 5 of the drawings, I have shown two sections of molding carrying electric current wires and disposed in axial alinement and having the confronting ends of the conductors connected by what may be termed a straight of way connection. In the present instance, this connection comprises a base 12 constructed of fiber or other suitable insulating material and equipped with outwardly projecting binding posts 13 designed to receive the connectors on the confronting ends of the wires. Interposed between the binding posts 13 is a partition or division plate 14.

In the construction illustrated in Fig. 6, I have shown two sections of molding arranged at right angles to each other and having the conductors therein electrically connected through the medium of an angle connection 15, such connection comprising a right angular base 16 of suitable insulating material. Outstanding from the base 16 and secured thereto are binding posts 17, 17, while outstanding from the base adjacent to one of the binding posts 17 is a binding post 18 electrically connected with the distant binding post 17 by means of a metallic strip 19. By means of this construction, it will be seen that the adjacent ends of the conductors within the right angular sections of molding may be electrically connected to one another. Division plates or partitions 20 are interposed between the binding posts 17, 17 and the binding post 17 and the adjacent post 18, such division plates being arranged at right angles to each other to prevent short circuiting.

From the foregoing description taken in connection with the accompanying drawings, the construction and manner of assembling the various parts of my invention will be readily apparent. It will be seen that I have provided an electric wiring system whereby the current carrying conductors are insulated from each other and the surrounding objects and held spaced apart so that short circuiting is eliminated, while the sections of molding carrying the conductors may be readily and conveniently connected to one another.

I claim:

In a system of molding, a pair of tubes of insulating material designed to envelop the respective circuit wires, a metal jacket elongated in cross section incasing said tubes and having one wall thereof formed with a longitudinal groove holding the tubes spaced apart in parallelism and the opposite walls thereof formed with alining openings between the tubes to receive securing screws, a base between the ends of adjacent jackets and tubes, and a division plate formed on said base and projecting outwardly therefrom and disposed centrally of the spaces between the tubes in the respective jackets.

In testimony whereof I affix my signature in presence of two witnesses.

WILLIAM J. KISTLER.

Witnesses:
Wm. Bagger,
E. Edmonston, Jr.